United States Patent
Austin et al.

(10) Patent No.: US 11,194,681 B2
(45) Date of Patent: Dec. 7, 2021

(54) METHOD AND SYSTEM FOR PROVIDING SUSTAINED RESILIENCY IN MAINFRAME ENVIRONMENT

(71) Applicant: JPMorgan Chase Bank, N.A., New York, NY (US)

(72) Inventors: Paul Austin, Lewis Center, OH (US); Duncan V. Brown, Poole (GB); Daniel J. Gunner, Westerville, OH (US); Allen L. Vencill, Jr., Land O Lakes, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/991,565

(22) Filed: Aug. 12, 2020

(65) Prior Publication Data
US 2021/0049082 A1  Feb. 18, 2021

Related U.S. Application Data

(60) Provisional application No. 62/885,422, filed on Aug. 12, 2019.

(51) Int. Cl.
*G06F 11/20* (2006.01)

(52) U.S. Cl.
CPC ...... *G06F 11/2033* (2013.01); *G06F 11/2025* (2013.01); *G06F 2201/85* (2013.01)

(58) Field of Classification Search
CPC ............. G06F 11/2033; G06F 11/2025; G06F 2201/85
See application file for complete search history.

(56) References Cited

U.S. PATENT DOCUMENTS

| | | | |
|---|---|---|---|
| 6,178,529 B1 * | 1/2001 | Short | G06F 11/2038 709/223 |
| 9,229,825 B2 * | 1/2016 | Gurram | G06F 11/2025 |
| 9,529,883 B2 * | 12/2016 | Bourbonnais | G06F 11/3632 |
| 10,169,173 B2 * | 1/2019 | Deng | G06F 11/1662 |
| 10,592,345 B2 * | 3/2020 | Helleren | G06F 9/5088 |
| 10,719,306 B2 * | 7/2020 | Deshmukh | G06F 16/183 |
| 10,877,862 B2 * | 12/2020 | Gao | G06F 11/2082 |
| 10,891,205 B1 * | 1/2021 | Trulli, Jr. | G06F 11/2023 |

(Continued)

OTHER PUBLICATIONS

Notification of Transmittal of the International Search Report and the Written Opinion of the International Searching Authority in PCT/US2020/045848 dated Nov. 6, 2020.

(Continued)

*Primary Examiner* — Matthew M Kim
*Assistant Examiner* — Indranil Chowdhury
(74) *Attorney, Agent, or Firm* — Hunton Andrews Kurth LLP

(57) ABSTRACT

An embodiment of the present invention is directed to enabling a mainframe system to be shutdown and restarted in an alternate region within minutes in a consistent and demonstrated manner ensuring data consistency for various components including disk, storage, coupling facility, etc. This enhances and packages together various software products from a mainframe platform in order to deliver a solution. An embodiment of the present invention is directed to an integrated automation that validates the integrity of the systems after restarting in remote regions.

20 Claims, 15 Drawing Sheets

(56) References Cited

U.S. PATENT DOCUMENTS

| | | |
|---|---|---|
| 2007/0186047 A1 | 8/2007 | Jarvis et al. |
| 2011/0099420 A1* | 4/2011 | MacDonald McAlister ................ G06F 16/178 714/6.32 |
| 2015/0058281 A1 | 2/2015 | Bourbonnais et al. |
| 2015/0058864 A1* | 2/2015 | Bourbonnais ......... G06F 9/4856 718/105 |
| 2017/0278031 A1 | 9/2017 | Hautala et al. |
| 2017/0295108 A1 | 10/2017 | Mahindru et al. |
| 2019/0391740 A1* | 12/2019 | Cheng ..................... G06F 3/067 |
| 2020/0089586 A1* | 3/2020 | Wong ..................... G06N 5/003 |
| 2021/0081287 A1* | 3/2021 | Koning ............... H04L 67/1097 |
| 2021/0157690 A1* | 5/2021 | Wexler ................ G06F 11/2025 |

OTHER PUBLICATIONS

Abrams et al. "How Resilient Is Your IBM Z System of Record?" In: IBM Systems Media. Jul. 22, 2019 (Jul. 22, 2019) Retrieved on Oct. 12, 2020 (Oct. 12, 2020) from <https://www.ibmsystemsmag.com/IBM-Z/07/201 9/IBM-z-system-of-record>.

Bayireddy. "Mainframe Resiliency becoming an Integral Part of the Cloud Computing Age." In: Navitas. Jun. 18, 2016 (Jun. 18, 2016) Retrieved on Oct. 12, 2020 (Oct. 12, 2020) from <https://www.navitas-tech.com/blog/uncategorlzed/malnframe-resillency-beoomlng-an-integral-part-of-the-cloud-computing-age/>.

* cited by examiner

Orchestrator Dashboard 1310

SR Playbook | Stages for: TS Flex Back [Back]

| Pre-Flex | S6S7-FlexBack 1314 | S6S7-ToLevel4 | Non-GDPS-Post-Flex | GDPS-Post-Flex 1312 | TS-SR-Complete |
|---|---|---|---|---|---|
| Complete | In-Progress | NOINFO | NOINFO | NOINFO | NOINFO |

- TGDPS62 ECS OPs (Complete) SCRIPT=IPLMODE_RS1
- TGDPS63 ECS Ops (Complete) IPLTYPE=*ALLGDPS MODE=RS1
- TGDPS64 ECS Ops (Complete) G120 ON TGP4 PLEASE ...
- TGDPS65 ECS Ops (In-Progress) PROD_SYS_LOAD
- TSTX23 ECS Ops (NOINFO) Reply Y to WTOR $HASP457... WTOR for first ...
- TSTX24 ECS Ops (NOINFO) As soon as JES2 gets ...
- TSTX25 ECS Ops (NOINFO) Validate Crypto keys
- TSTX26 SWG (NOINFO) Validate License keys
- TSTX27 ODS (NOINFO) ODS team validate CA-View/CA-... Not Critical...
- TSTX28 ECS Ops (NOINFO) Level 2LPAR validation ... [Confirm]
- TSTX29 GTI Event Manager (NOINFO) Confirm that L2 validations... [Confirm]

---

SR Step 1316

| ID | Status | Description |
|---|---|---|
| TGDP565 | In-Progress | PROD_SYS-LOAD |

Auto Events

| ID | Name | Status | LPAR | SLOT |
|---|---|---|---|---|
| TGDP... | PROD... | SUCCESS | TGP3 | S3TS |
| TGDP... | LPAR | SUCCESS | S6GP | S3TS |
| TGDP... | LPAR | SUCCESS | S7GP | S3TS |
| TGDP... | LPAR | SUCCESS | S7GP | S3TS |
| TGDP... | LPAR | SUCCESS | S6GP | S3TS |
| TGDP... | G140... | SUCCESS | TGP3 | S3TS |

Tasks
S6GP                                S7GP

Progress: 109/109          Progress: 65/122

| ATLEVEL1 | ATLEVEL1 |
|---|---|
| CAS9 | AOPOGDPS |
| CCILGR | CAS9 |
| CCITCP | CCILGR |
| CFZCIM | CCITCP |
| CMSC | CFZCIM |
| COASNCDR | CMSC |
| COATAPDR | COASNCDR |
| CSF | COATAPDR |
| CSSMTP | CSF |
| DLF | CSSMTP |
| ENF | CSSMTP1 |

FIGURE 13

METHOD AND SYSTEM FOR PROVIDING SUSTAINED RESILIENCY IN MAINFRAME ENVIRONMENT

CROSS REFERENCE TO RELATED APPLICATIONS

The application claims priority to U.S. Provisional Application 62/885,422, filed Aug. 12, 2019, the contents of which are incorporated herein in its entirety.

FIELD OF THE INVENTION

The invention relates generally to a method and system for improved resiliency in mainframe environments.

BACKGROUND OF THE INVENTION

With opportunities that cyber threats places on technologies, the ability to failover and recover all systems, including legacy platforms, in alternate regions is a critical requirement for enterprise class systems. The current disaster recovery testing process typically provides a stand-alone demonstration of a platforms recovery. Even when done in tandem with other platforms, it is typically isolated by firewalls and is a functional test.

These and other drawbacks currently exist.

SUMMARY OF THE INVENTION

According to one embodiment, the invention relates to providing sustained resiliency in mainframe environments. The system comprises: a memory component that stores and manages data; and a computer processor, coupled to the memory component, wherein the computer processor is configured to perform the steps of: invoking a failover script at a mainframe system; validating a system shutdown of the mainframe system; preventing workload movement to one or more other systems; holding batch work and automated processes associated with the mainframe system; initiating a system close of the mainframe system that confirms a system close success and a memory de-stage completion to ensure consistent hardware replication to one or more alternate sites; and passing control associated with the mainframe system to a remote region.

According to another embodiment, the invention relates to a method for providing sustained resiliency in mainframe environments. The method comprises the steps of: invoking a failover script at a mainframe system; validating a system shutdown of the mainframe system; preventing workload movement to one or more other systems; holding batch work and automated processes associated with the mainframe system; initiating a system close of the mainframe system that confirms a system close success and a memory de-stage completion to ensure consistent hardware replication to one or more alternate sites; and passing control associated with the mainframe system to a remote region.

A method of an embodiment of the present invention may be conducted on a specially programmed computer system comprising one or more computer processors, mobile devices, electronic storage devices, and networks.

The computer implemented system, method and medium described herein can provide the advantages of improved resiliency and stability. The various embodiments of the present invention may achieve performance benefits and advantages for customers, end users, entities as well as financial institutions. An embodiment of the present invention recognizes that having a sustained resiliency and recovery model for critical legacy mainframe systems that can be completed in an automated, rapid, consistent manner ensuring data integrity is critical for any environment that uses mainframe technology. Developing and enhancing vendor delivered products with controls and balances ensure that confidence grows when failing over large, multi-tenant systems.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 13 is an exemplary user interface, according to an embodiment of the present invention.

DETAILED DESCRIPTION OF THE PREFERRED EMBODIMENT(S)

Figure 1:
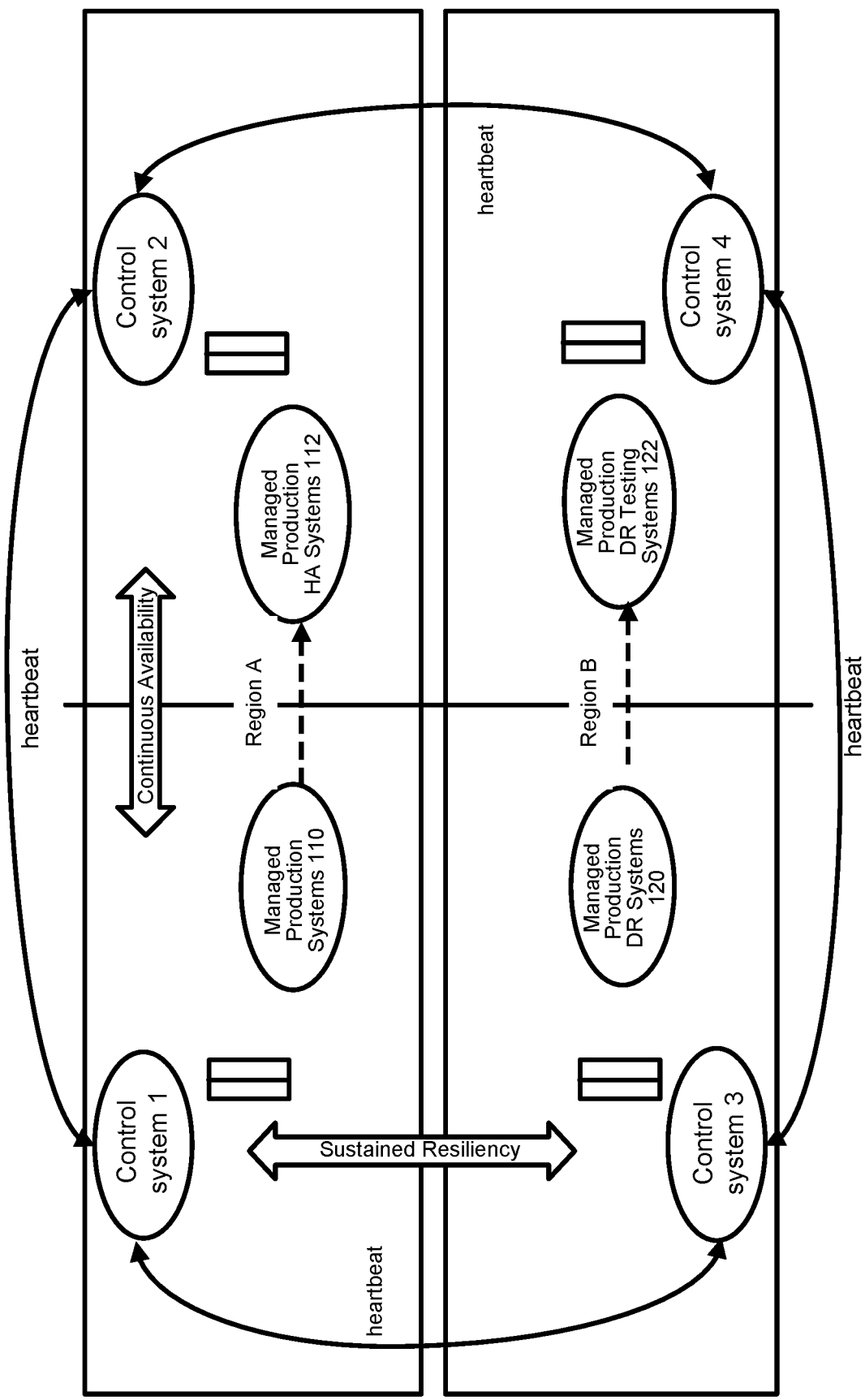
FIG. 1 is an exemplary illustration of sustained resiliency, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to enabling a mainframe system to be shutdown and restarted in an alternate region within minutes in a consistent and demonstrated manner ensuring data consistency for various components including disk, storage, coupling facility, etc. This involves packaging together various software products from a mainframe platform in order to deliver a solution. An embodiment of the present invention is directed to an integrated automation that validates the integrity of the systems after restarting in remote regions. An embodiment of the present invention is further directed to a defined process for "re-paving" mainframe systems from an immutable copy for additional resiliency to a platform.

Mainframe systems execute a large percentage of critical workloads across various industries worldwide. An embodiment of the present invention is directed to implementing sustained resiliency for mainframe systems complex or other cluster of independent instances. The innovative process provides the ability to exit datacenters and operate from alternate locations on a regular basis for its critical systems. The criticality of this process is ensuring data de-stage and "hardening" of data out of cache and memory onto "at rest" hardware which enables consistent hardware replication to alternate sites. Checks and balances are in place to ensure data consistency of replication at remote sites at all times.

An exemplary end-to-end process involves invoking failover script and passing control to a remote region. Invoking failover script may involve: validating full system shutdown; preventing workload movement to remaining systems; holding batch work and automated housekeeping; and initiating system close where system (1-n) closes successfully and cache/memory de-stage is completed. Passing control to remote region may involve: formatting remote region infrastructure; acknowledging data validation receipt; initiating disk failover process; completing disk failover process with checks and balances; enabling hardware in remote region; commencing initial system startup; formatting coupling facility structures; completing initial region validations; system (1-n) system startups; completing system recoveries; performing rapid validation, reversing replication; and releasing the system in production.

According to an embodiment of the present invention, the recovery process may include three distinct exemplary phases: Pre Failover Tasks; System Failover; and Post Failover Tasks.

According to an embodiment of the present invention, a key component of an ability to failover mainframe systems consistently may include a series of scripts that manage, oversee and execute the failover process in a timely manner using "control systems." These "control systems" may represent stand-alone systems that manage execution of the scripts for a process.

An embodiment of the present invention may be directed to enforcing a de-stage of data onto persistent media, a critical step in the process. This may include: de-staging of spooled data to files; flushing of coupling facility data to files; de-staging of storage array cached data to hard drives; providing consistent validated hardware replication and providing an ability to make data on tape media available for read—but protected from being overwritten.

FIG. 1 is an exemplary illustration of sustained resiliency, according to an embodiment of the present invention. FIG. 1 illustrates flex CDCx primary replication flex to an alternate site. CDCx represents Core Data Centers.

Control System scripts may validate full system shutdown; prevent workload movement to remaining systems; hold batch work and automated housekeeping; initiate system close (e.g., system (1-n) closes successfully and cache/memory de-stage completed). Control System Scripts may format remote region infrastructure.

As shown in FIG. 1, heartbeat data may be communicated between Control Systems. Heartbeat data may indicate whether the system is running properly. In addition, heartbeat data may be used to determine whether the system needs to failover to a local High Availability (HA) copy. For example, this may involve Managed Production Systems 110 failover to Managed Production HA systems 112. In region 2, this may involve Managed Production DR Systems 120 failover to Managed Production DR Testing Systems 122. Continuous availability may be provided within Region A, between Control System 1 and Control System 2 while sustained resiliency may occur between Region A and Region B.

Figure 2:
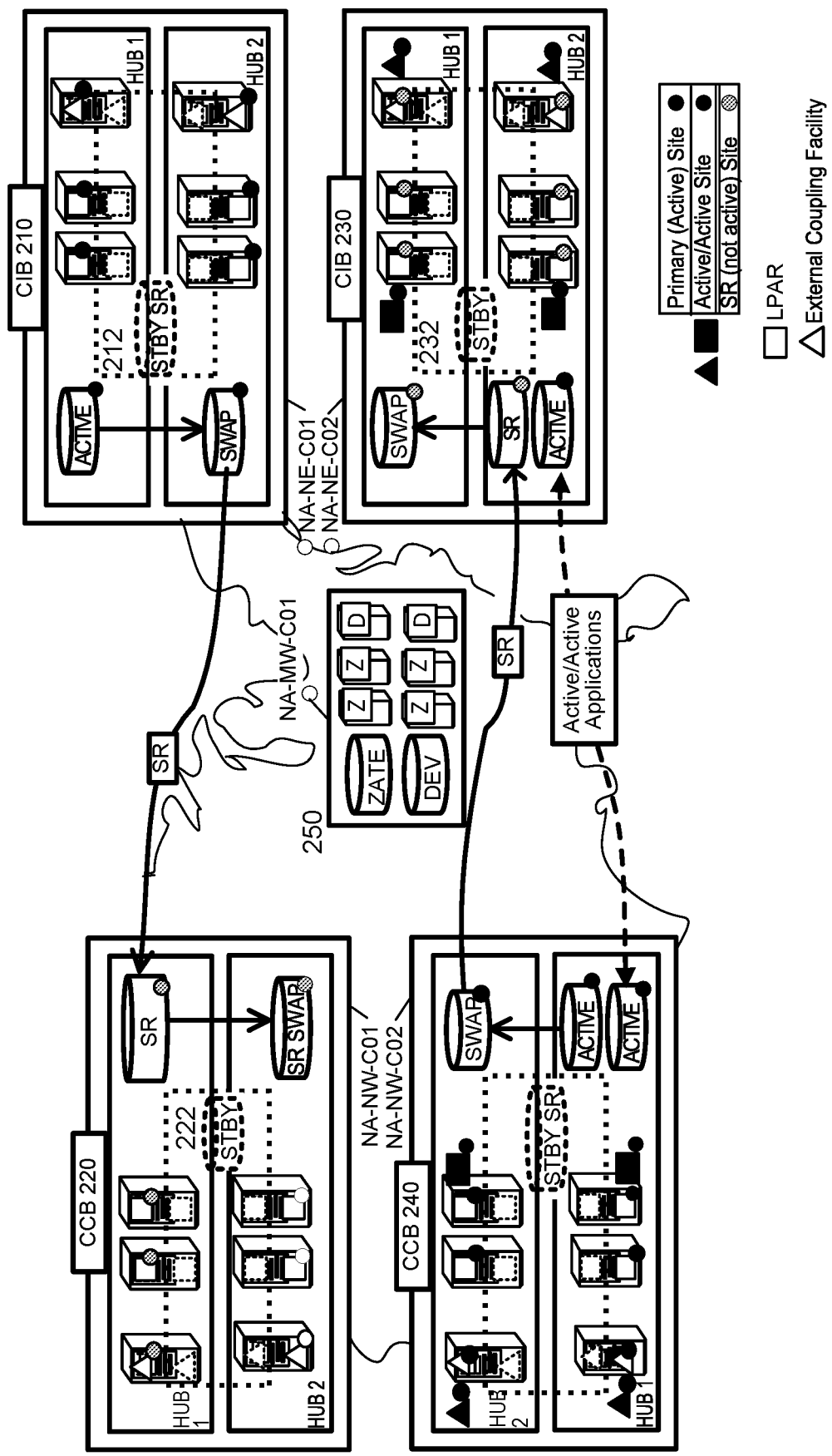
FIG. 2 is an exemplary data center strategy, according to an embodiment of the present invention.

FIG. 2 is an exemplary data center strategy, according to an embodiment of the present invention. CCB may be directed to deliver resilient and agile site strategy while best adhering to the current run rate. CCB (Consumer and Community Banking) and CIB (Corporate and Investment Bank) represent exemplary lines of business. Other lines of business may be implemented.

CIB 210 includes Hub 1 with Active and Hub 2 with SWAP. Standby SR (Sustained Resiliency) is shown by the dotted lines at 212. As shown by the black circles, these components represent Primary (Active) Site.

CCB 220 includes Hub 1 with SR and Hub 2 with SR SWAP. Standby is shown by the dotted lines at 222. As shown by the grey circles, these components represent SR (not active) Site.

CIB 230 includes Hub 1 with SR and Active and Hub 2 with SR SWAP. Standby SR is shown by the dotted lines at 232. As shown by the black circles, these components represent Primary (Active) Site. Black rectangles (LPAR) and triangles (external coupling facilities) represent Active/Active Site. As shown by the grey circles, these components represent SR (not active) Site.

CCB 240 includes Hub 1 with Active and Active and Hub 2 with SWAP. Standby SR is shown by the dotted lines at 242. As shown by the black circles, these components represent Primary (Active) Site. Black rectangles (LPAR) and triangles (external coupling facilities) represent Active/Active Site.

As shown in FIG. 2, Primary 210 may be in the East (NE-001) and SR 220 to the West (NW-001). An exemplary build of a standby environment 230 may be added in the East (NE-002) and SR 240 in the West (NW-002).

CIB may include Primary 240 in the West (NW-002) and SR 230 to the East (NE-002). An exemplary build of a standby environment 220 may be added in the West (NW-001) and SR 210 in the East (NE-001).

As shown in FIG. 2, the four site location strategy may provide a base infrastructure for buildouts of STANDBY environments in the same regional site as the ACTIVE environments. The ZATE environments 250 may be centrally located in a particular location (NA-MW-001) for both CIB and CCB—"zATE Build". ZATE may represent large scale testing environments. This removes TEST workloads in the four production sites. For example, any required application resiliency modifications are not included in the strategic data center design/budget but strategically lays the foundation for each line of business (LOB) to pursue an Active/Standby design if desired with an agile approach.

Figure 3:
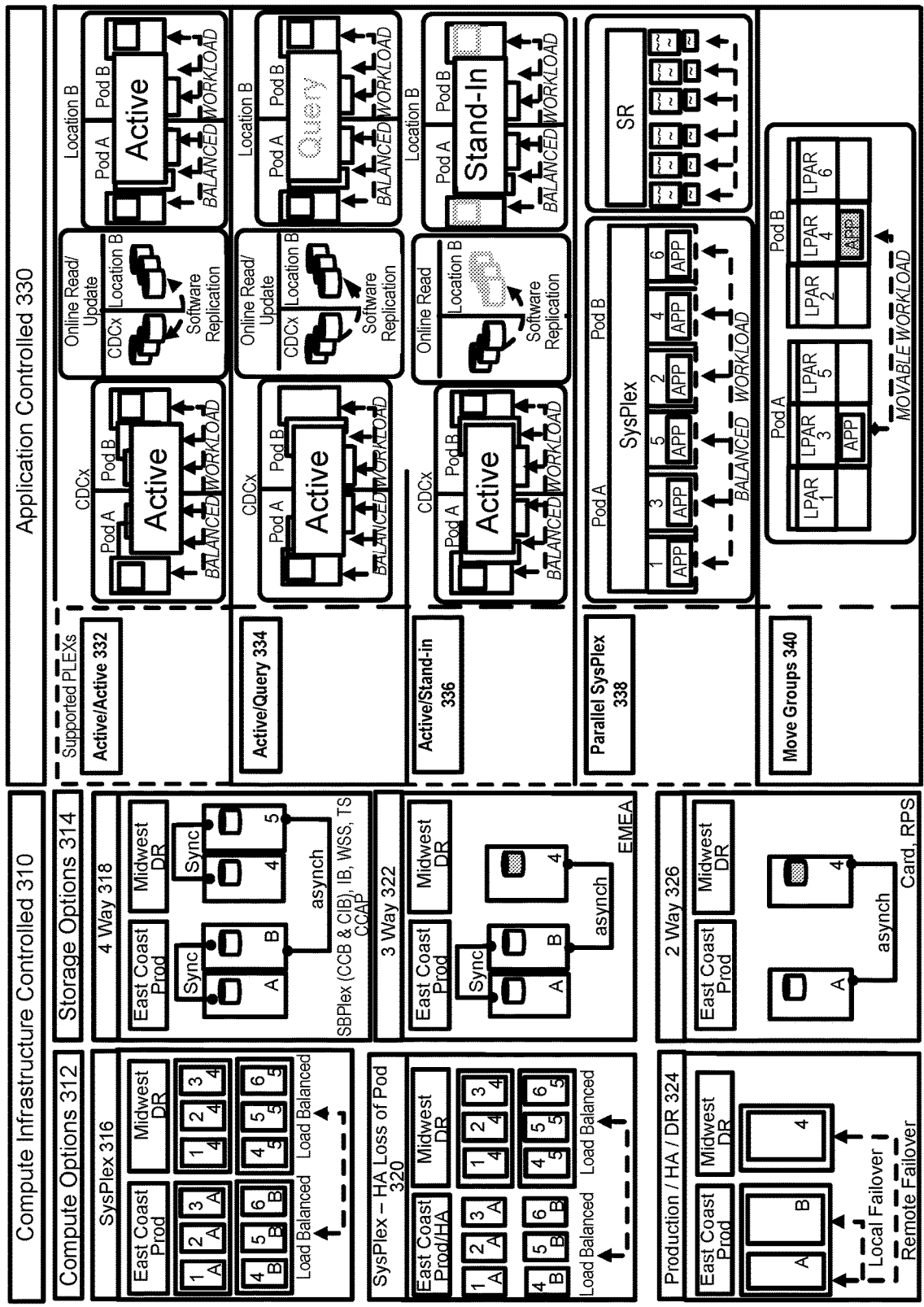
FIG. 3 is an exemplary mainframe production resiliency options illustration, according to an embodiment of the present invention.

FIG. 3 is an exemplary mainframe production resiliency options illustration, according to an embodiment of the present invention. As shown in FIG. 3, Compute Infrastructure Controlled 310 may include Compute Options 312 and Storage Options 314. Compute Options 312 may include SysPlex 316, SysPlex—HA Loss of Pod 320 and Production/HA/DR 324. SysPlex may represent a collection of mainframes or other cluster of systems working together. Storage Options 314 may include 4 Way 318, 3 Way 322 and 2 Way 326. Other options may be supported.

Business application processes and services may be supported by high-end zEnterprise servers and associated high performance and/or highly available storage subsystems. There are multiple Resiliency Options available to application processing.

Application controlled resiliency may keep business critical applications and processes continuously available with no impact to application capability or performance. Application Controlled 330 may include Active/Active 332; Active/Query 334; Active/Stand-in 336; Parallel SysPlex 338; and Move Groups 340.

Sustained Resiliency may include an ability to swap over to an alternate location, supporting on-line activity and full production cycles for an extended period of time. For example, replication of data may occur in an opposite direction—original alternate to original primary. After planned processing time, the system may swap back to original primary site.

Local Compute Continuous Availability may protect mission-critical applications and data against planned and unplanned events.

With Local Compute High Availability, a system may be designed so that a single component failure causes little to no interruption of availability. A "Highly Available" System may sustain a single component failure.

With Out of Region Recovery, a system and its ecosystem may failover to an alternate location as a result of an unplanned catastrophic failure. Processing may continue once the infrastructure is enabled at the alternate site. It does not include failing back or replicating data to a third or tertiary location.

For Storage Controlled, an embodiment of the present invention may support various storage grid options that provide a resilient highly available infrastructure supporting business continuity, recovery and failover. Through a grid configuration, a series of clusters may be connected to form a high availability, resilient architecture. This configuration ensures high availability so that production work continues if one or more clusters become unavailable. Other configurations may be supported.

With Two Way Grid 326, if the primary storage should become unavailable, a decision would have to be made to move from Primary to Alternate. This event may cause a disruption of service to business processing.

Three Way Grid 322 may be architected to recover storage by swapping to another environment within the same data center if a critical storage failure scenario is detected.

Four Way Grid 318 provides immediate and non-disruptive failover to a High Availability POD should there be a critical storage failure problem with the primary. If the primary becomes unavailable, the alternate High Availability (HA) slot may continue processing, without any disruption.

Figure 4:
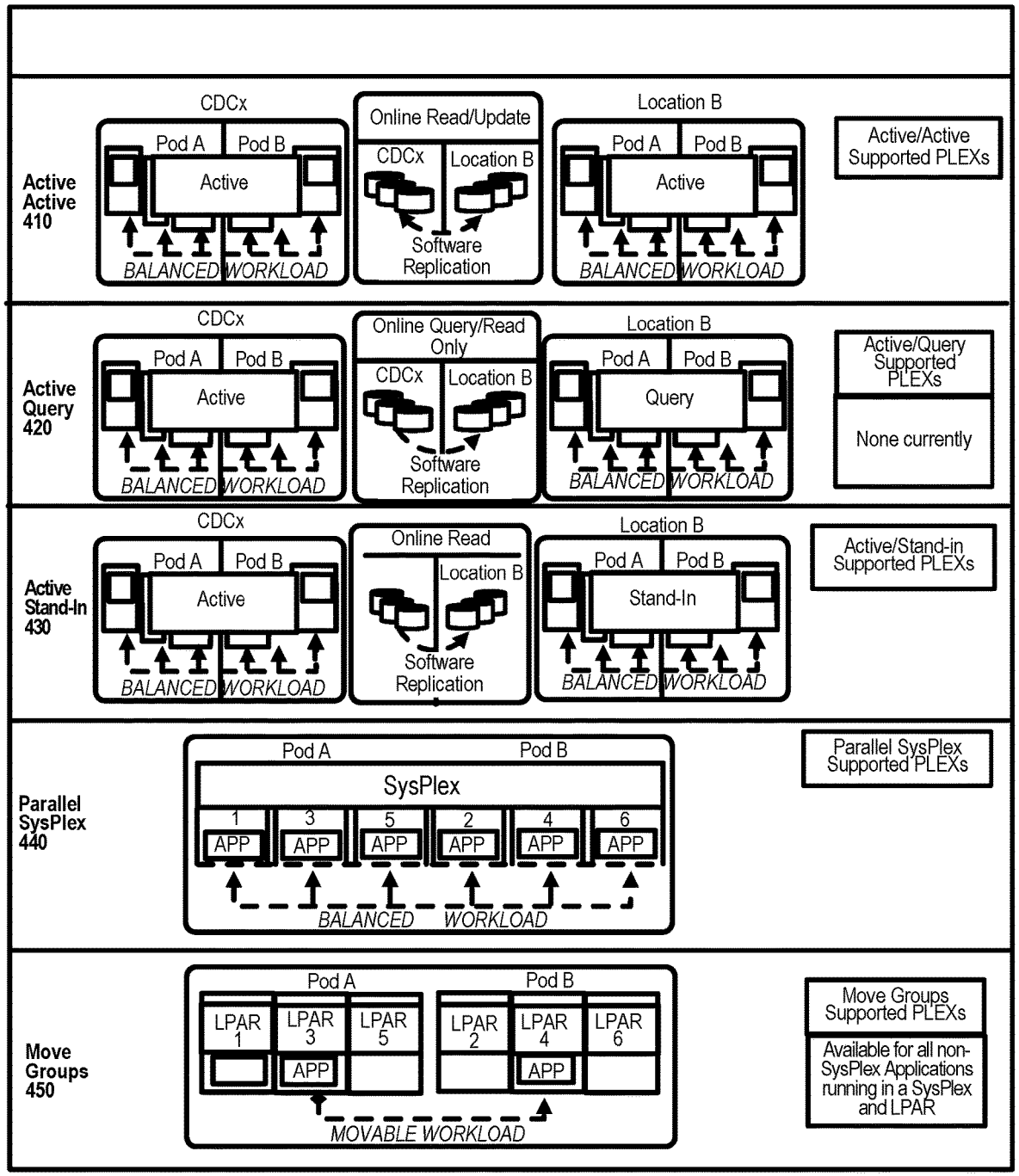
FIG. 4 is an exemplary application resiliency exploitation illustration, according to an embodiment of the present invention.

FIG. 4 is an exemplary application resiliency exploitation illustration, according to an embodiment of the present invention.

Application controlled resiliency may be applied to make business critical applications and processes available with no reduced or no impact to application capability or performance.

Components may include Primary and Alternate Pods that may be in the same physical building separated by a firewall, for example. Each of the Pods may be supported by their own power supply and network connections.

With Active Active 410, transaction processing may flow to either site running the same applications and having the same data. Database activity may be replicated from the active site to the other active site via DB software replication. Should there be a logical partition (LPAR) failure, processing may be automatically re-routed to the other active LPARS.

Active Query 420 may provide the ability to designate one site as the active system for both online reads and updates while the secondary site provides the ability to support queries and read-only transaction requests. Database activity may be replicated from the active site to the query site via DB software replication. In the event of a planned or unplanned outage, the site that was designated for read-only may assume read and update capability with replication back to the original site.

Active Stand-In 430 supports online read only workloads for planned events or temporary failover. This may include near current data populated via DB software replication. This configuration allows for workload to be moved between sites with minimal effort. This may be used for planned outage such as weekend scheduled maintenance, primary site is temporarily unavailable, or transition processing for a real disaster.

Parallel SysPlex 440 may represent a predecessor for Central Electronics Complex (CEC)/Logical Partition (LPAR) Continuous Availability. This supports planned or unplanned outage. Workload may be automatically balanced across various PLEXes (SysPlexes) in the PLEX. Multiple CEC/LPAR may be assigned to PLEX. Applications may be SysPlexed and may work across various LPARS in PLEX. In the event of a CEC/LPAR outage, workload may be automatically rebalanced to remaining LPARs in the PLEX.

With Move Groups 450, automated workload may redirect from one LPAR to another within defined PLEX. This supports Single or Multiple LPAR on the PLEX, where DASD (direct access storage device) may be made available to alternate LPAR. Through automation, the Primary LPAR may be stopped. The workload may be redirected to an alternate LPAR where work may then be restarted on an alternate LPAR.

Figure 5:
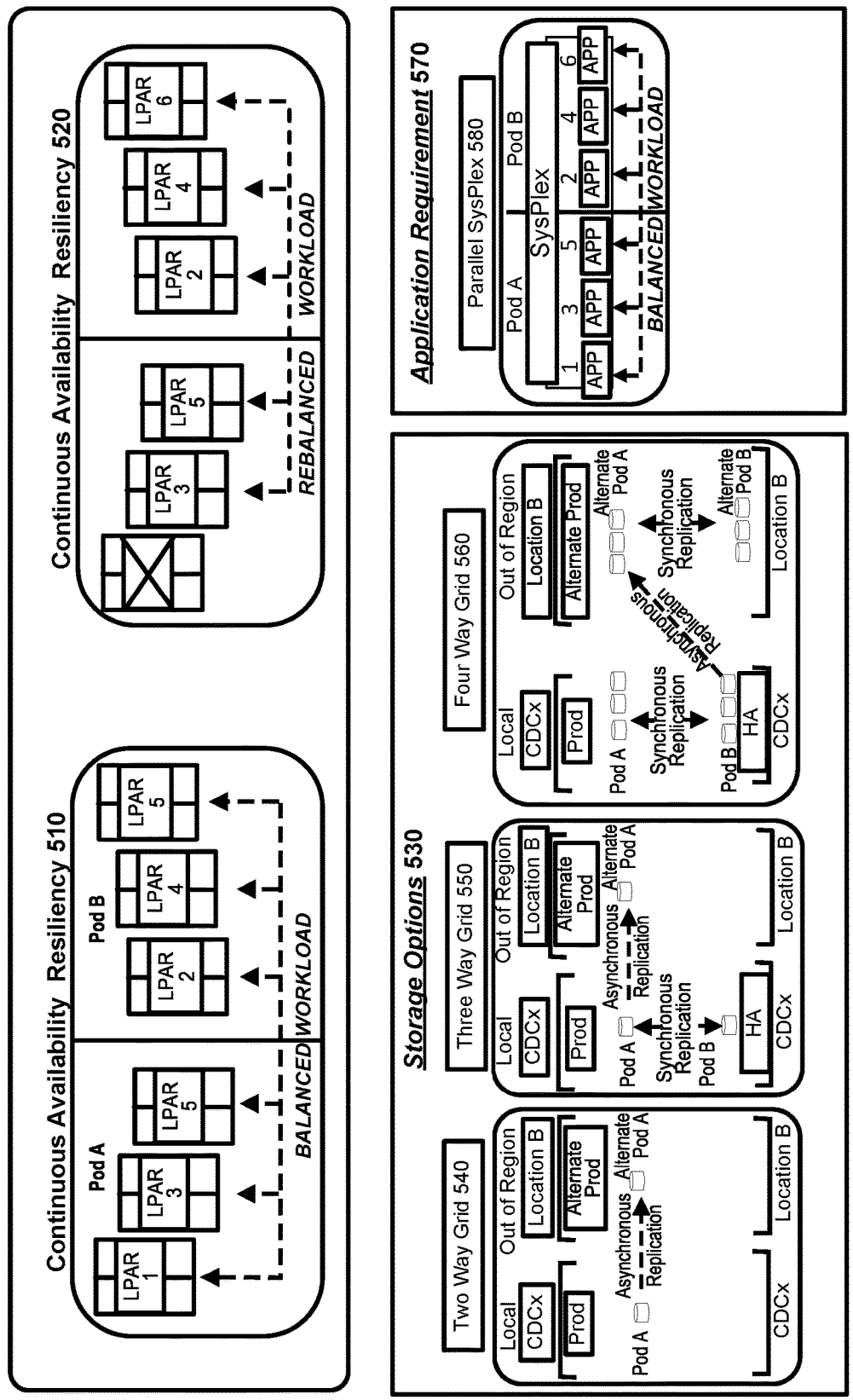
FIG. 5 is an exemplary local compute continuous availability illustration, according to an embodiment of the present invention.

FIG. 5 is an exemplary local compute continuous availability illustration, according to an embodiment of the present invention. As shown in FIG. 5, continuous availability resiliency 510 may support POD A and POD B having multiple LPARs with a balanced workload. Continuous availability resiliency 520 illustrates a rebalanced workload scenario. Storage Options 530 may include Two Way Grid 540, Three Way Grid 550 and Four Way Grid 560. Application Requirement 570 may support Parallel SysPlex 580 with multiple PODs, e.g., POD A and POD B.

Local Compute Continuous Availability protects mission-critical applications and data against planned and unplanned events. Workload may run on some or all processors. If a processor is not available, workload may be rebalanced to other processors, as shown in 520. Continuous availability combines the characteristics of high availability and continuous operation to provide the ability to keep the business application running with minimal or any noticeable downtime.

As shown in FIG. 5, Local Compute Continuous Availability may be accomplished by providing multiple CEC/

LPARS and rebalancing processing to an available CEC/LPAR at times when one CEC/LPAR is unavailable.

This may support planned or unplanned outage. Workload may run on some or all processors in the PLEX. According to an embodiment of the present invention, workload may be automatically rebalanced; multiple CEC/LPAR may be assigned to PLEX; and applications may be SysPlexed.

In the event of a CEC/PAR outage, workload may be automatically rebalanced to other LPAR in infrastructure PODs. Once the original POD CEC/LPAR may be re-established, the SysPlexed application workload may be automatically rebalanced across various available LPARs in the PLEX.

Figure 6:
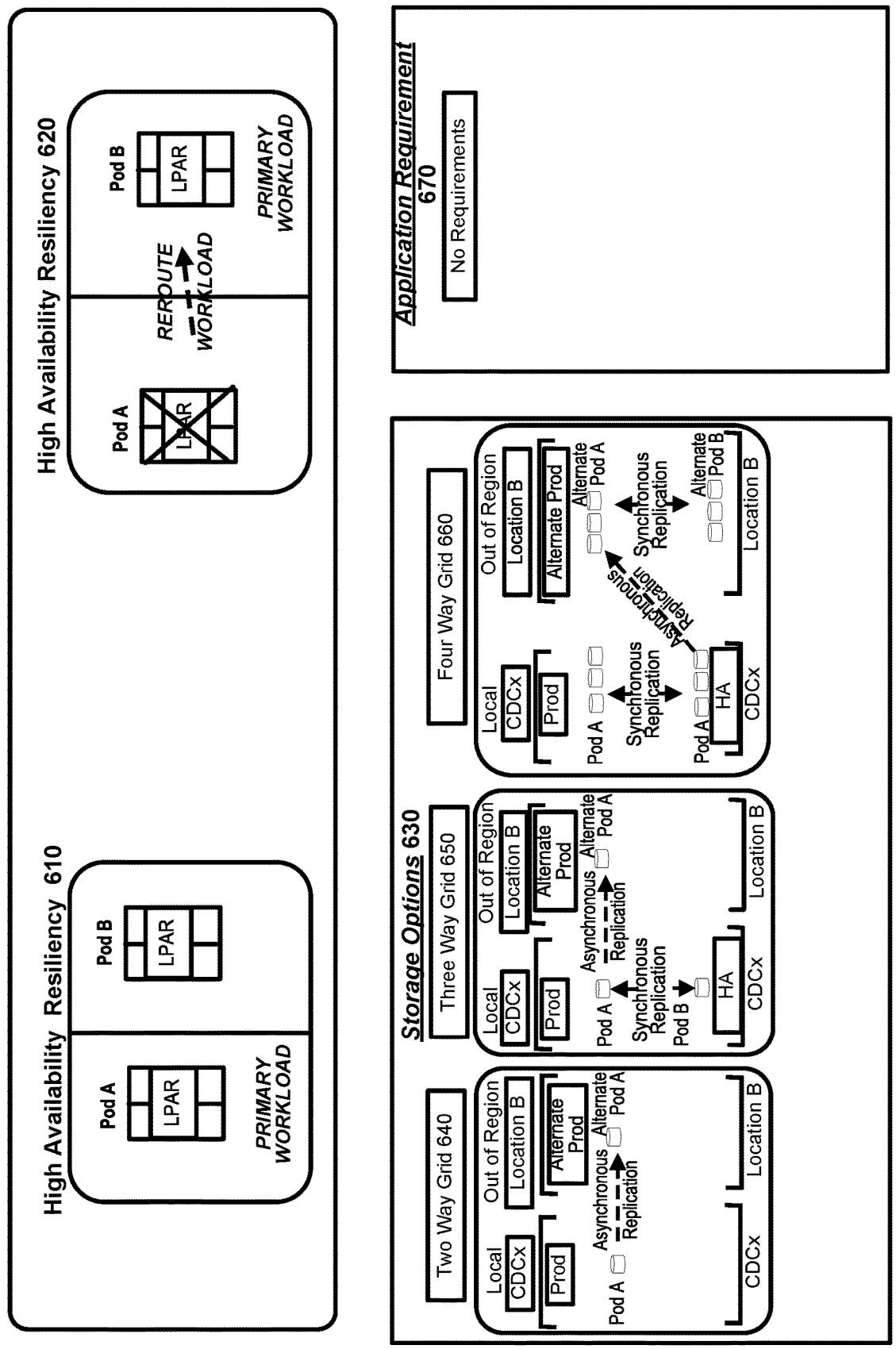
FIG. 6 is an exemplary local compute high availability illustration, according to an embodiment of the present invention.

FIG. 6 is an exemplary local compute high availability illustration, according to an embodiment of the present invention.

As shown in FIG. 6, high availability resiliency 610 may support POD A and POD B having a corresponding LPAR. POD A represents a primary workload. High availability resiliency 620 illustrates a rerouted workload to POD B, as the primary workload. Storage Options 630 may include Two Way Grid 640, Three Way Grid 650 and Four Way Grid 660. Application Requirement 670 may be provided. In this scenario, there are no requirements.

A system may be designed so that a single component failure causes little to no interruption of availability. A "Highly Available" System may sustain a single component failure, as shown by 610, 620. This may provide immediate and non-disruptive failover to a High Availability (HA) alternate should there be a component failure the primary. If the primary should become unavailable, the alternate HA slot may continue processing without any disruption.

Local Compute High Availability may be accomplished by providing single CEC/LPAR switching processing to an available CEC/LPAR at times when the CEC/LPAR is made unavailable.

Characteristics may include: Single CEC assigned to PLEX; Single or multiple LPARS and Applications are not SysPlexed.

In the event of a CEC/LPAR outage, an alternate POD CEC/LPAR may be used to restore the business. This may require an initial program load (IPL) to restore workload.

Once an original POD CEC/LPAR is re-established, an application workload may be targeted back to a Primary POD CEC/LPAR. This may require an IPL to restore workload.

Primary and HA Pods may be in the same physical building separated by a firewall. Each of the Pods may supported by their own power supply and network connections. Other configurations may be supported.

Figure 7:
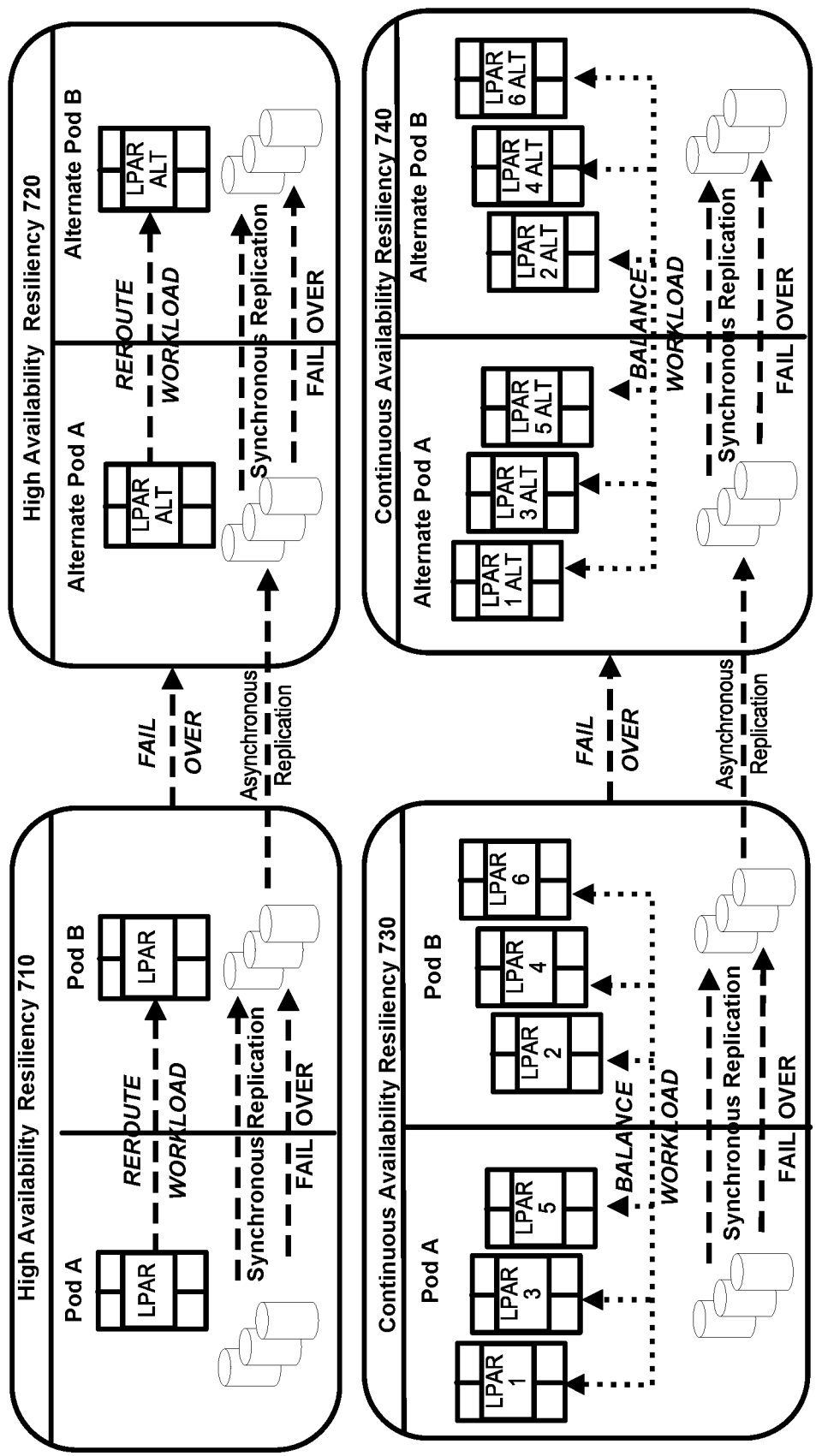
FIG. 7 is an exemplary storage resiliency illustration, according to an embodiment of the present invention.

FIG. 7 is an exemplary storage resiliency illustration, according to an embodiment of the present invention. As shown in FIG. 7, High Availability Resiliency 710, 720 may support failover and asynchronous replication. As shown in FIG. 7, High Availability Resiliency 710 supports POD A and POD B whereas High Availability Resiliency 720 supports Alternate POD A and Alternate POD B. Continuous Availability Resiliency 730 and 740 may support failover and asynchronous replication. As shown in FIG. 7, Continuous Availability Resiliency 730 may supports POD A and POD B whereas Continuous Availability Resiliency 740 supports Alternate POD A and Alternate POD B. Other scenarios may be supported.

A system and its ecosystem may failover to an alternate location as a result of an unplanned catastrophic failure. Processing may continue once the infrastructure is enabled at the alternate site. This may not include failing back or replicating data to a third or tertiary location, for example.

Primary CDCx may represent Primary and Alternate Pods in the same physical building separated by a firewall. Each of the Pods are supported by their own power supply and network connections.

DR Primary and DR Alternate Pods may be in the same physical building separated by a firewall. Each of the Pods may be supported by their own power supply and network connections.

Characteristics may include: near 365×24×7 availability; application workload level is high availability; automated workload routing/recovery; and HA hardware failure transparent to application and delivery of sustained resiliency. Additional features may include: high availability processing with zero loss of data; high performance delivering recovery point and recovery time objectives; consistency across multiple data bases ensuring application restart ability and IPL required.

Figure 8:
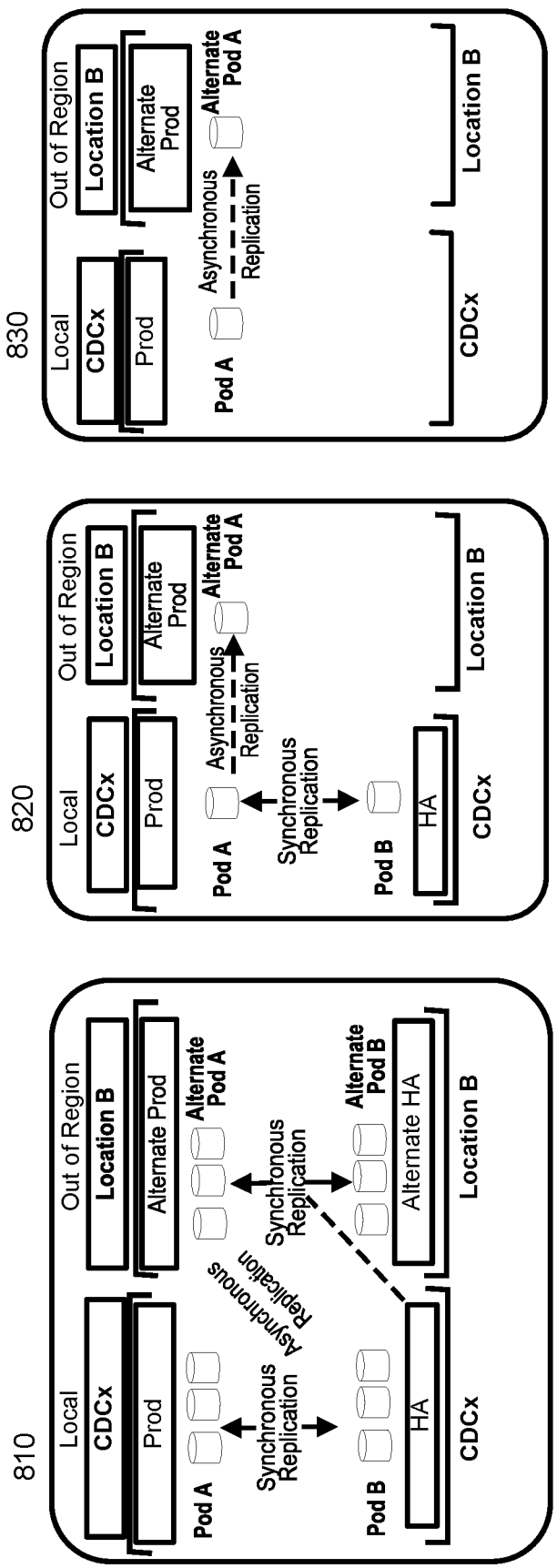
FIG. 8 is an exemplary storage resiliency illustration, according to an embodiment of the present invention.

FIG. 8 is an exemplary storage resiliency illustration, according to an embodiment of the present invention. An embodiment of the present invention may support various storage grid options that provide a resilient highly available infrastructure supporting business continuity, recovery and failover. Through a grid configuration, a series of clusters may be connected to form a high availability, resilient architecture. This configuration ensures high availability so that production work continues if one or more clusters become unavailable.

With a Four Way Grid 810, continuous storage availability provides immediate and non-disruptive failover to a High Availability POD should there be a critical storage failure problem with the primary. If the primary becomes unavailable, the alternate HA slot may continue processing, without any disruption.

The Four Way grid option provides a resilient Continuous Highly Available infrastructure supporting business continuity, recovery and failover. Through the grid configuration, a series of clusters may be connected to form a high availability, resilient architecture. This configuration ensures Continuous Availability so that production work continues if one or more clusters become unavailable.

Features may include: highly automated failover routing/recovery; HA hardware failure transparent to application; delivery of sustained resiliency near 365×24×7 availability; high availability processing with near zero loss of data; high performance delivering recovery point and recovery time objectives; and consistency across multiple data bases ensuring application restart ability.

With Three Way Grid 820, high storage availability may be architected to recover storage locally in the applicable data center by swapping to another environment within the same data center if a critical storage failure scenario is detected. If the primary storage should become unavailable, an alternate HA storage slot may continue processing without any disruption.

Features may include: automated workload routing/recovery; HA hardware failure transparent to application; delivery of sustained resiliency; high availability processing with near zero loss of data; high performance delivering recovery point and recovery time objectives; and consistency across multiple data bases ensuring application restart ability.

With Two Way Grid 820, storage availability may be low. If the primary storage becomes unavailable, a decision may have to be made to move from Primary to Alternate. This event may cause a disruption of service to business processing.

Features may include: some automated workload routing/recovery; HA hardware may not be supported; minimum sustained resiliency; some flexibility with near zero data loss; consistency across multiple data bases ensuring application restart ability; lower performance recovery point and recovery time objectives; and some production environments do not utilized Storage High Availability.

Figure 9:
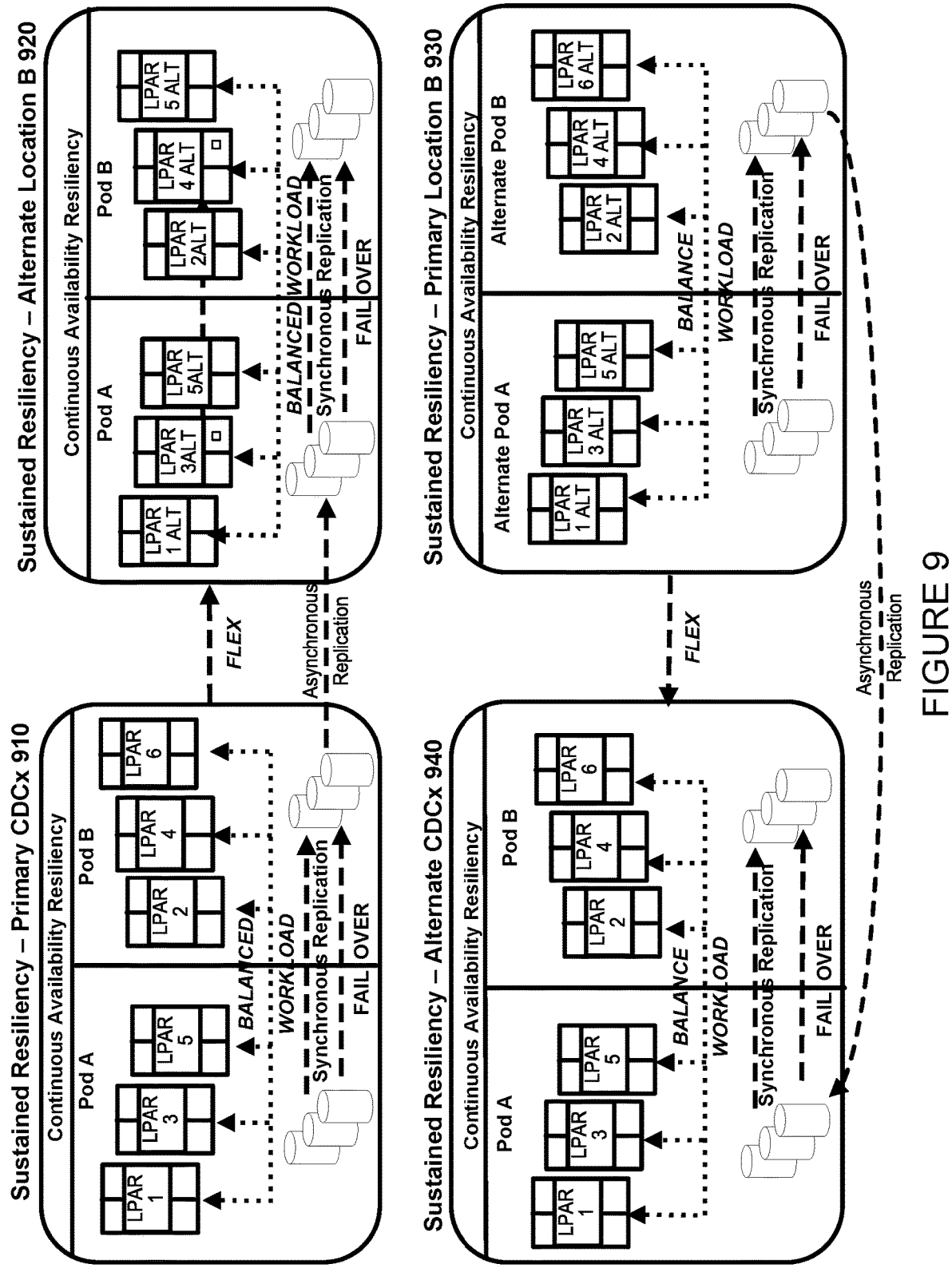
FIG. 9 is an exemplary illustration of sustained resiliency, according to an embodiment of the present invention.

FIG. 9 is an exemplary illustration of sustained resiliency, according to an embodiment of the present invention. FIG. 9 illustrates CDCx primary replication flex to an alternate site with asynchronous replication. As shown in FIG. 9, Primary CDCx 910 may flex over to Alternative Location B 920 with asynchronous replication. Primary Location B 930 may flex to Alternate CDCx 940.

An embodiment of the present invention is directed to providing an ability to swap over to an alternate location, supporting on-line activity and full production cycles for an extended period of time. Replication of data may occur in an opposite direction—original alternate to original primary. After planned processing time, the system may swap back to original primary site.

Sustained Resiliency (zFLEX) may represent an ability to run (or swap) a production workload in their disaster recovery processing site for an extended period, then swap back for processing in the primary site. The ability to swap a production and DR environment may not only definitively test contingency procedures but provide a greater flexibility for production site upgrades while minimizing down time.

Requirements for sustained resiliency may include: an alternate site configuration that handles production load; planned zFlex execution performed in a down time window; alternate site is readily available at all times with current production data; application components function on both sides without any change; production environment is separated from development; and Service/Capabilities/Performance/Capacity provided in FLEX in the same as production.

In this embodiment, existing HA capabilities may be maintained on both primary and secondary sites.

A Sustained Resiliency (SR) event may represent when data from one data center is moved to another data center where processing takes place in the target data center. During an SR Event, an embodiment of the present invention may perform a graceful shutdown of the production systems so all activity is stopped, ensuring cached data is de-staged to disk. The hardware replication may then cascade this data to a target site. With an embodiment of the present invention, this may be managed via a set of automated scripts.

In a failover process of an embodiment of the present invention, unnecessary manual validation steps may be removed. In addition, checkout processes may be automated. Data validation may be streamlined on a sysplex startup process and an improved user interface (UI) may orchestrate the process end to end for the operators, as illustrated in FIGS. 10-15.

An embodiment of the present invention may result in a reduction in the time to recover the system. More specifically, exceptionally fast recovery times may be achieved.

Figure 10:
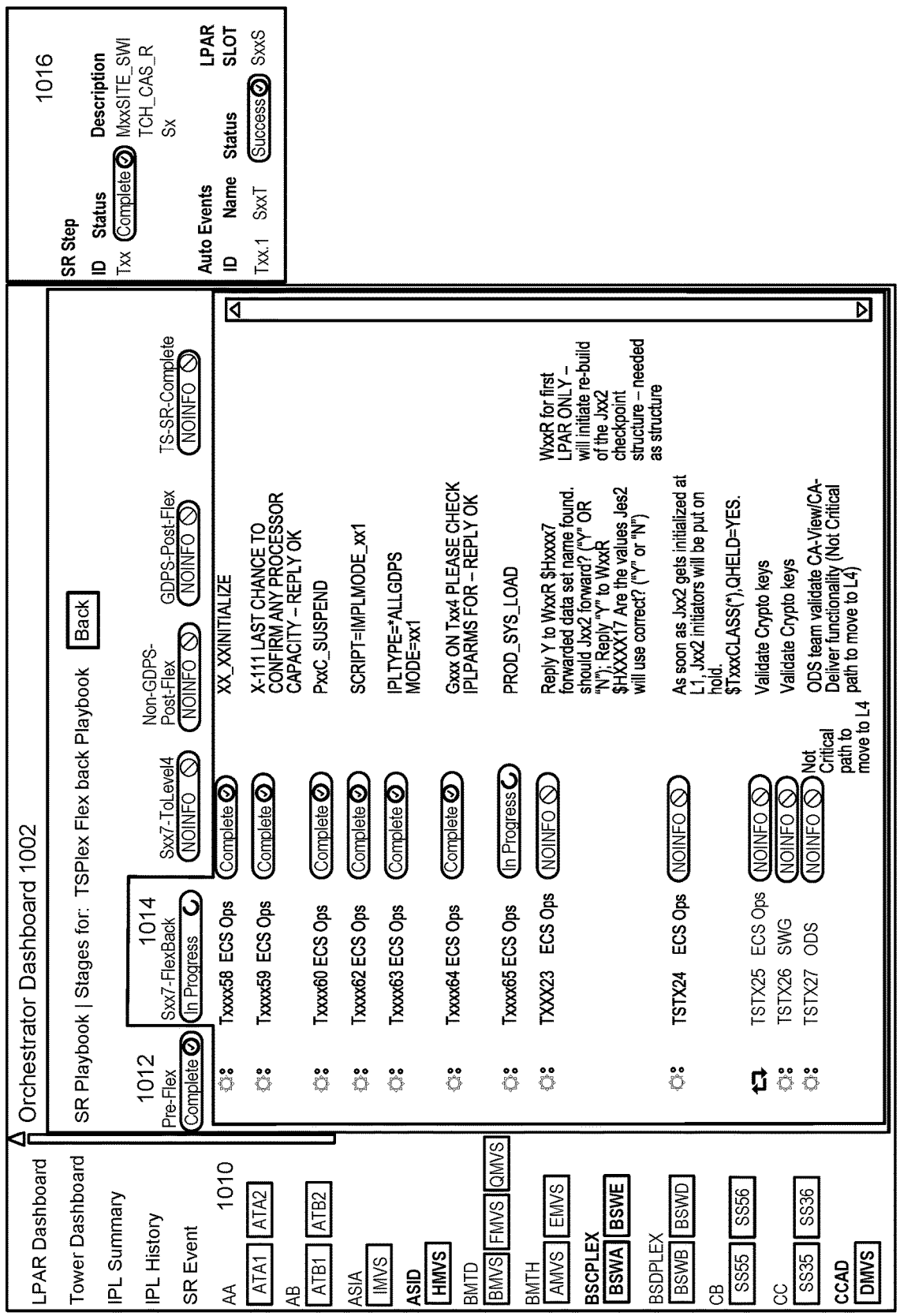
FIG. 10 is an exemplary user interface, according to an embodiment of the present invention.

FIG. 10 is an exemplary user interface, according to an embodiment of the present invention. FIG. 10 illustrates an orchestrator dashboard at 1002. Panel 1010 provides dashboard and view options. Various tabs at 1012 are provided. By selecting a particular tab, Tab 1014, details are provided including type, task, owner, status, milestone, description, comments, action, etc. For example, status may include complete, in progress, no information, etc. SR Step 1016 provides an identifier, status, description and Auto Events.

Figure 11:
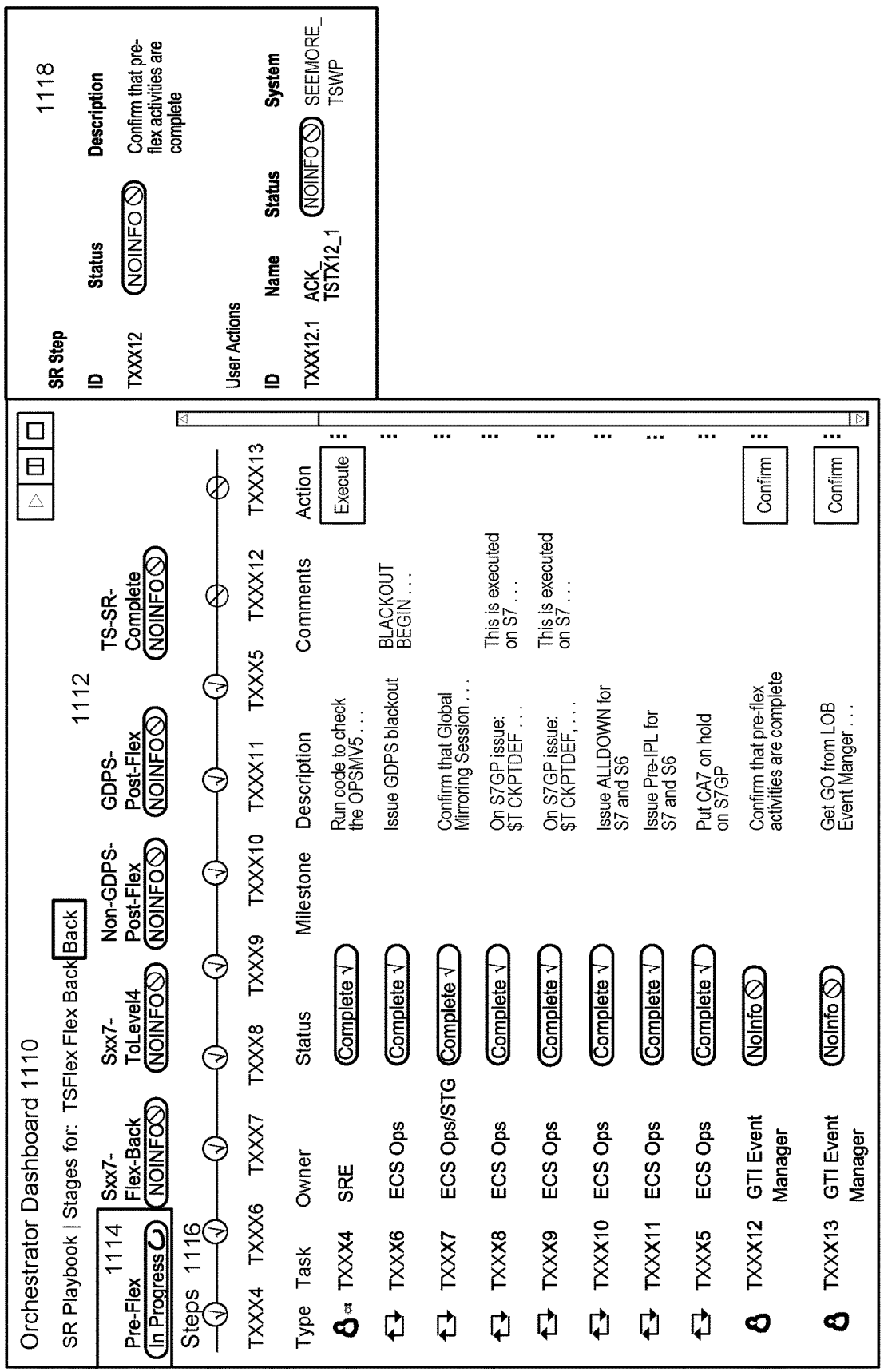
FIG. 11 is an exemplary user interface, according to an embodiment of the present invention.

FIG. 11 is an exemplary user interface, according to an embodiment of the present invention. FIG. 11 illustrates an orchestrator dashboard at 1110. Various tabs at 1112 are provided. By selecting a particular tab, Tab 1114, details are provided including type, task, owner, status, milestone, description, comments, action, etc. Steps and progress are shown at 1116. SR Step 1118 provides an identifier, status, description and User Actions. For example, SR Step 1118 corresponds to Step TXXX12, which shows "No Info." Steps TXXX4-TXXX5 are shown to be complete.

Figure 12:
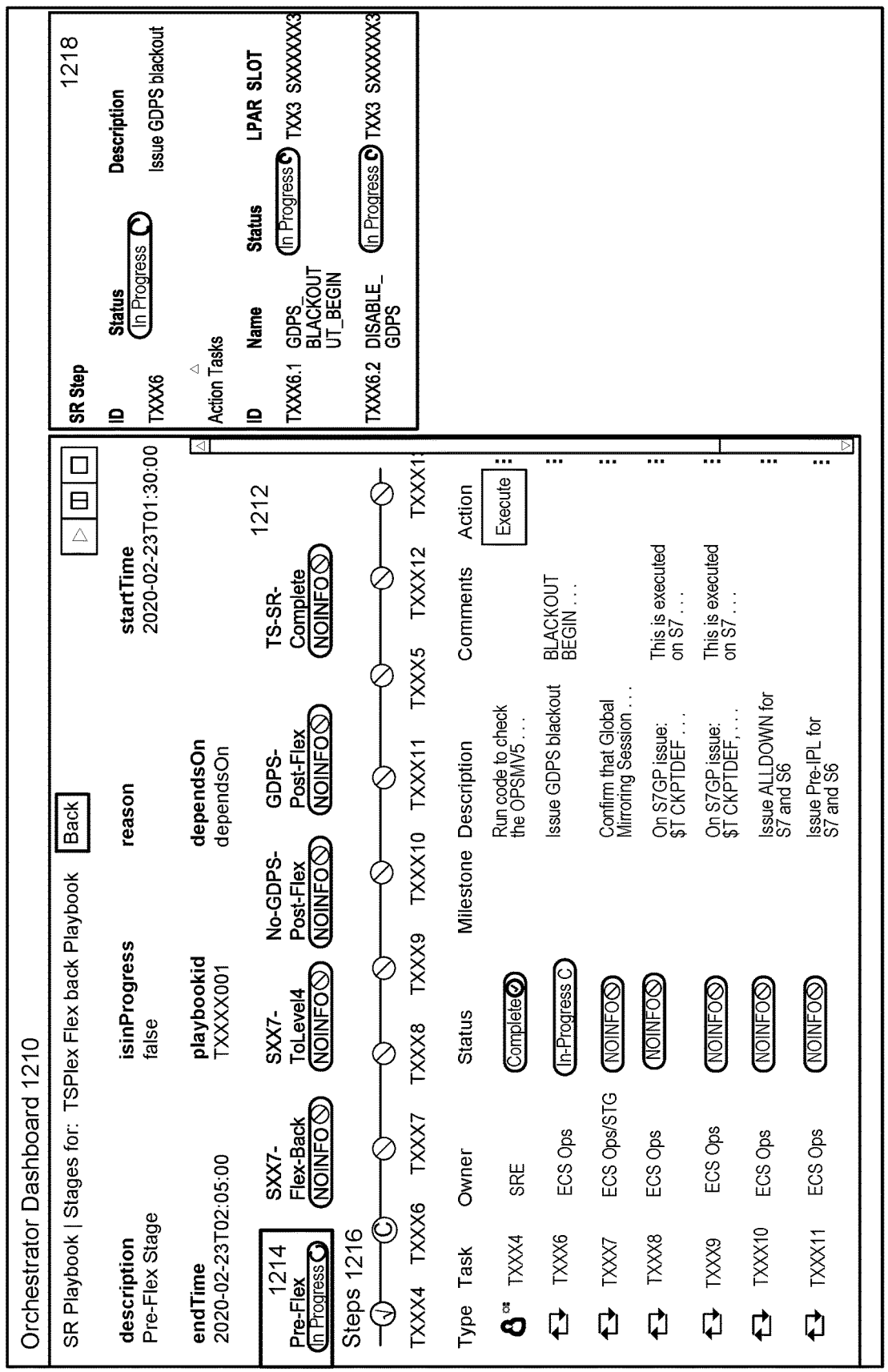
FIG. 12 is an exemplary user interface, according to an embodiment of the present invention.

FIG. 12 is an exemplary user interface, according to an embodiment of the present invention. FIG. 12 illustrates an orchestrator dashboard at 1210. Various tabs at 1212 are provided. By selecting a particular tab, Tab 1214, details are provided including type, task, owner, status, milestone, description, comments, action, etc. Steps and progress are shown at 1216. SR Step 1218 provides an identifier, status, description and multiple Action Tasks. For example, SR Step 1218 corresponds to Step TXXX6, which is in progress.

FIG. 13 is an exemplary user interface, according to an embodiment of the present invention. FIG. 13 illustrates an orchestrator dashboard at 1310. Various tabs at 1312 are provided. By selecting a particular tab, Tab 1314, details are provided including type, task, owner, status, milestone, description, comments, action, etc. In addition, status, such as complete, in-progress and no information may be provided. SR Step 1316 provides an identifier, status, description and multiple Auto Events, including identifier, name, status, LPAR, Slot, etc. Other information may include Tasks and Progress data.

Figure 14:
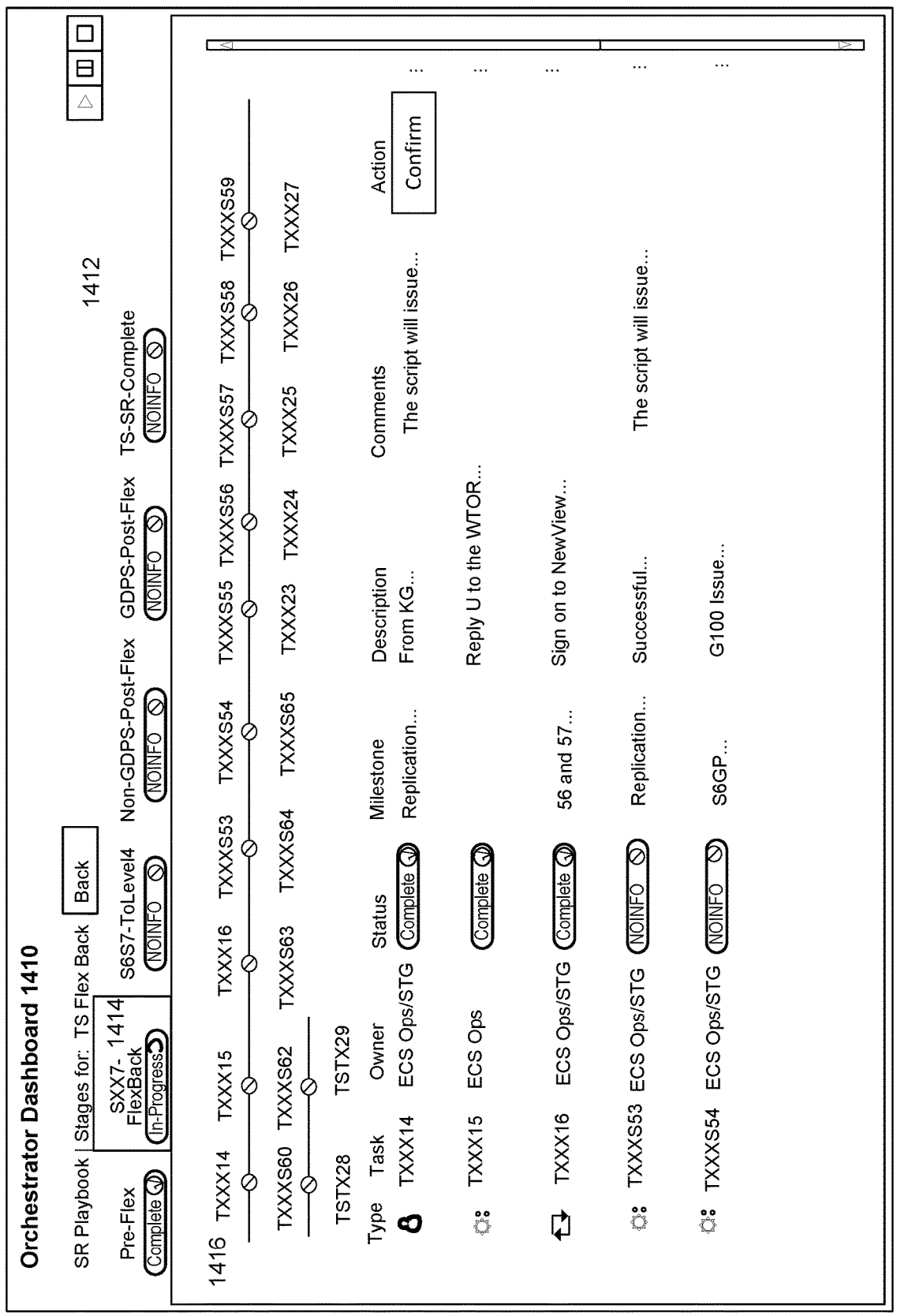
FIG. 14 is an exemplary user interface, according to an embodiment of the present invention.

FIG. 14 is an exemplary user interface, according to an embodiment of the present invention. FIG. 14 illustrates an orchestrator dashboard at 1410. Various tabs at 1412 are provided. By selecting a particular tab, Tab 1414, details are provided including type, task, owner, status, milestone, description, comments, action, etc. 1416 represents a series of steps and corresponding status.

Figure 15:
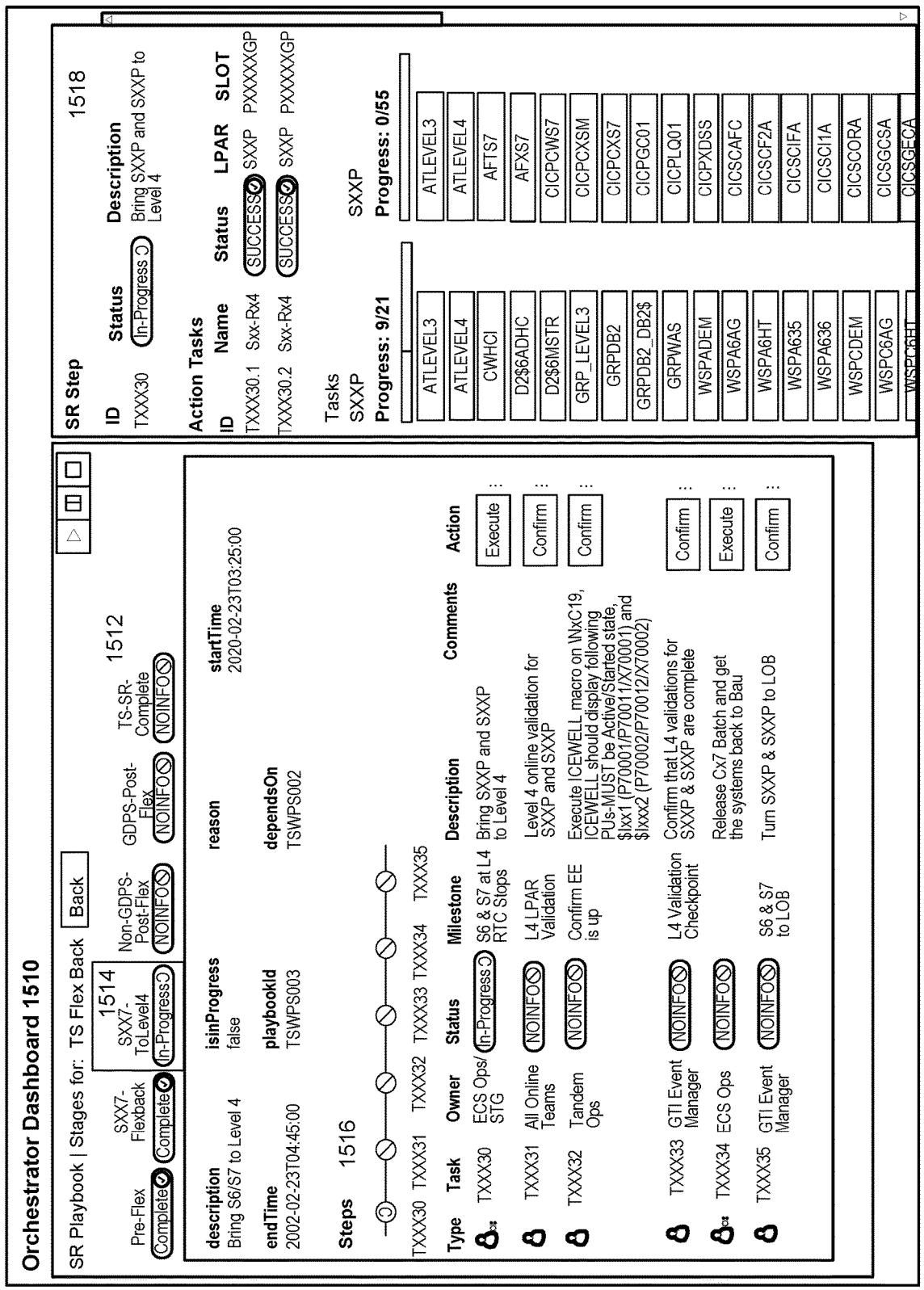
FIG. 15 is an exemplary user interface, according to an embodiment of the present invention.

FIG. 15 is an exemplary user interface, according to an embodiment of the present invention. FIG. 15 illustrates an orchestrator dashboard at 1510. Various tabs at 1512 are provided. By selecting a particular tab, Tab 1514, details are provided including type, task, owner, status, milestone, description, comments, action, etc. Steps and progress are shown at 1516. SR Step 1518 provides an identifier, status, description and multiple Auto Events, including identifier, name, status, LPAR, Slot, etc. Other information may include Tasks and Progress data. For example, SR Step 1518 corresponds to Step TXXX30, which is in progress.

With an embodiment of the present invention, a mainframe sustained resiliency process may include an ability to "repave" a mainframe instance from an immutable cyber protected copy of the environment.

An embodiment of the present invention may integrate Logical Corruption Protection (LCP) that enables the system to "snap" points in time images of mainframe disk systems.

Enhancements to the failover process may include using standard disk replication technologies to initiate a system recovery from (or to use one of the point in time snapshots) to rebuild the system from in the remote region. This would enable recovery from a cyber attack where primary and replicated copies have been compromised—or even to mitigate the concept of delayed malware being injected into the environment.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

As described above, a set of instructions is used in the processing of various embodiments of the invention. FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system for providing sustained resiliency in mainframe environments, the system comprising:
   a memory component that stores and manages data; and
   a computer processor, coupled to the memory component, wherein the computer processor is configured to perform the steps of:
   invoking a failover script at a mainframe system;
   validating a system shutdown of the mainframe system;
   preventing workload movement to one or more other systems;
   holding batch work and automated processes associated with the mainframe system;
   initiating a system close of the mainframe system that confirms a system close success and a memory de-stage completion to ensure consistent hardware replication to one or more alternate sites; and
   passing control associated with the mainframe system to a remote region.

2. The system of claim 1, wherein passing control associated with the mainframe system to a remote region comprises: formatting a remote region infrastructure.

3. The system of claim 1, wherein passing control associated with the mainframe system to a remote region comprises: acknowledging data validation receipt.

4. The system of claim 1, wherein passing control associated with the mainframe system to a remote region comprises: initiating a disk failover process with one or more checks and balances.

5. The system of claim 1, wherein passing control associated with the mainframe system to a remote region comprises: enabling hardware in the remote region.

6. The system of claim 1, wherein passing control associated with the mainframe system to a remote region comprises: commencing initial system start-up; formatting one or more coupling facility structures; and completing initial region validations.

7. The system of claim 1, wherein passing control associated with the mainframe system to a remote region comprises: completing system recoveries; performing rapid validation, reversing replication and releasing system in production.

8. The system of claim 1, wherein the computer processor is further configured to perform the step of: applying a recovery process comprising at least pre-failover tasks; system failure and post failover tasks.

9. The system of claim 1, wherein the memory de-stage completion comprises the steps of: de-staging of spooled data to files; flushing of coupling facility data to files; de-staging of storage array cached data to hard drives; and providing consistent validated hardware replication.

10. The system of claim 1, wherein the computer processor is further configured to perform the step of: providing a user interface comprising an orchestrator dashboard that provides a plurality of process steps and corresponding status.

11. A method for providing sustained resiliency in mainframe environments, the method comprising the steps of:
    invoking a failover script at a mainframe system;
    validating a system shutdown of the mainframe system;
    preventing workload movement to one or more other systems;
    holding batch work and automated processes associated with the mainframe system;
    initiating a system close of the mainframe system that confirms a system close success and a memory de-stage completion to ensure consistent hardware replication to one or more alternate sites; and
    passing control associated with the mainframe system to a remote region.

12. The method of claim 11, wherein passing control associated with the mainframe system to a remote region comprises: formatting a remote region infrastructure.

13. The method of claim 11, wherein passing control associated with the mainframe system to a remote region comprises: acknowledging data validation receipt.

14. The method of claim 11, wherein passing control associated with the mainframe system to a remote region comprises: initiating a disk failover process with one or more checks and balances.

15. The method of claim 11, wherein passing control associated with the mainframe system to a remote region comprises: enabling hardware in the remote region.

16. The method of claim 11, wherein passing control associated with the mainframe system to a remote region comprises: commencing initial system start-up; formatting one or more coupling facility structures; and completing initial region validations.

17. The method of claim 11, wherein passing control associated with the mainframe system to a remote region comprises: completing system recoveries; performing rapid validation, reversing replication and releasing system in production.

18. The method of claim 11, further comprising the step of: applying a recovery process comprising at least pre-failover tasks; system failure and post failover tasks.

19. The method of claim 11, wherein the memory de-stage completion comprises the steps of: de-staging of spooled data to files; flushing of coupling facility data to files; de-staging of storage array cached data to hard drives; and providing consistent validated hardware replication.

20. The method of claim 11, further comprising the step of: providing a user interface comprising an orchestrator dashboard that provides a plurality of process steps and corresponding status.

* * * * *